Nov. 17, 1942.    W. T. MEARS    2,302,501
RIVETED JOINT
Filed July 18, 1941

Inventor
William T. Mears
By Blackmore, Spencer & Fleet
Attorneys

Patented Nov. 17, 1942

2,302,501

UNITED STATES PATENT OFFICE 2,302,501

RIVETED JOINT

William T. Mears, Anderson, Ind., assignor to General Motors Corporation, Detroit, Mich., a corporation of Delaware Application July 18, 1941, Serial No. 402,967

1 Claim. (Cl. 218—29)

My invention relates to a method of securing thin sheet material to a support by riveting.

It often happens that thin sheet materials must be riveted to supporting heavier sheet materials or to a supporting bracket. In many cases the aforesaid thin sheet material is not strong enough to support the riveted end of a rivet fastener so that the head of the rivet must be against the opening in the thin sheet material. The frequent result is that the hammered or riveted end of the fastener is exposed to view, and it would be preferable to have the rivet inverted in the opening to expose the head to view. To permit using the rivet with the head against the external bracket or heavier external sheet material it then becomes necessary to provide some additional means of support for the thin sheet material at the place where the rivet extends through the sheet.

It is an object of my invention to provide a method of riveting thin sheet materials in which the opening in the thin sheet material is reinforced.

More specifically, it is the principal object of my invention to provide a method of riveting thin sheet materials in which the rivet opening in said material is extruded in such a manner as to provide a reinforcing extension or boss about the opening.

Figure 1 of the drawing is a sectional view of a thin sheet secured to a support by my improved riveting method.

Figure 1:
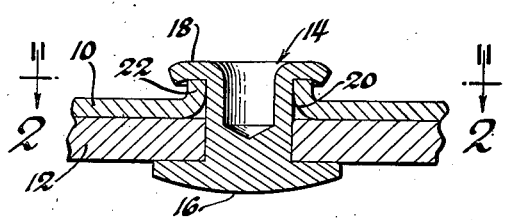
Figure 2:
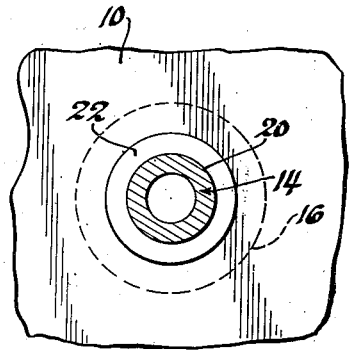
Figure 2 is a view on line 2—2 of Figure 1.
Figure 3:
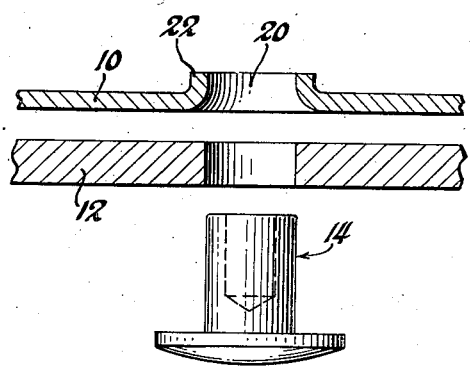
Figure 3 is a view of the parts before they are riveted together.

A thin sheet of material 10, such as lightweight sheet metal, is shown riveted to a supporting sheet of heavier material or to a bracket 12. By way of example, these parts may represent an automobile headlamp body riveted to its supporting bracket. In the circumstances under discussion, the structure and relationship of the parts is such that only the bracket end of the rivet is exposed to view. For this reason, it is desirable that rivet 14, in the final assembled condition of the parts, occupy the position shown in Figure 1 in which head 16 is exposed to view.

If a hole were punched in sheet 10 just large enough to accommodate the shank of rivet 14 and this rivet were applied by inserting it from the bracket side, it would be found that the light weight of sheet 10 would permit tearing out of the hammered end 18 of rivet 14. This applies particularly to light weight sheet metal parts such as are used for the housings of automobile headlamps and the like. I have found that it is possible to strengthen the sheet material about the opening by a drawing or extrusion process, whereby hole 20 in sheet 10 is made by drawing or extruding the material about the opening so as to form an extension or boss 22. This may be done by first stamping or punching a hole in sheet 10 which is smaller than the desired final opening, and then drawing the edge of the opening thus formed to make an upstanding edge or boss 22 at one side of the sheet; or, if desired, the entire job may be done in one operation. Then when rivet 14 is hammered over, as shown at 18 in Figure 1, the added strength of sheet 10 due to boss 22 is such that rivet 14 will hold the parts 10 and 12 together without danger of tearing of sheet material 10.

Figure 4:
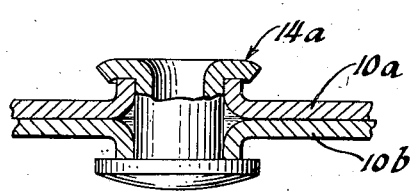
Figure 4 is a modification of my invention.

Changes and modifications will be apparent to those skilled in the art. For example, as seen in Figure 4, it might be desirable to use the reinforcing extension of my invention to hold two thin sheets 10a and 10b together by rivet 14a, instead of riveting a sheet to a support. In this case, it might be desirable to reinforce the opening in both sheets.

I claim:

A sheet metal structure, comprising: a thin sheet metal member having relatively poor resistance to tearing stress, a plate member having a surface complementary to a portion of said first member and disposed in facial contact therewith, and means for securing said thin sheet metal member to said plate member comprising a substantially cylindrical tubular boss drawn from the material of said thin sheet metal member and extending perpendicularly outwardly from its obverse surface and a rivet member anchored in said complementary plate member portion, said rivet member having a hollow shank snugly passing outwardly through and protruding well beyond the tubular boss of said first member and having its thus-protruded terminal portion swaged over and back upon the end edge of said drawn tubular boss.

WILLIAM T. MEARS.